United States Patent [19]

Beardmore et al.

[11] 4,118,203

[45] Oct. 3, 1978

[54] WAX COMPOSITION

[75] Inventors: James W. Beardmore; Daniel Goehring, both of Houston

[73] Assignee: Shell Oil Company, Houston, Tex.

[21] Appl. No.: 798,229

[22] Filed: May 18, 1977

[51] Int. Cl.² .................... C08L 91/08; C10L 5/00; C11C 5/00
[52] U.S. Cl. ........................ 44/7.5; 106/270; 106/271; 264/328; 264/330; 264/338; 431/288
[58] Field of Search ................ 106/270, 271; 44/7.5; 264/328, 330, 338; 431/288

[56] References Cited

U.S. PATENT DOCUMENTS 2,897,593    8/1959    Hollander et al. .................. 106/270

*Primary Examiner*—Theodore Morris

[57] ABSTRACT

Lower alkyl diesters of aliphatic dicarboxylic acids and phthalic acids provide effective mold release agents when added to candle wax compositions in low concentrations.

19 Claims, No Drawings

WAX COMPOSITION

BACKGROUND OF THE INVENTION

1. Field of the Invention

This invention relates to candle wax compositions containing esters of dicarboxylic acids and which have improved mold and pin release properties.

2. The Prior Art

Today's modern candle bears small resemblance to the old-fashioned variety of yesterday. Yet, despite this, the basic production methods have remained the same. Candles are either molded, dipped or rolled. In the molding process the mold release characteristics of the wax become very important.

The molding of candles represents one of the most mechanized of the candle-making procedure. Typically a candle-molding machine comprises a number of cylindrical metal molds made of tin or lead-tin alloy and oriented vertically. The temperature of the molds can be controlled by circulating hot or cold water. Within each mold there is a plunger which ejects the finished candle after it is molded. At the ends of the plungers are tip formers through which the wick passes up the mold center and which imparts the characteristic shape to the burning end of the molded candle. After the wicks are in place, molten candle wax is poured into the mold. Atop the molds is an overflow space that is filled to allow for contraction of the wax in the mold as it cools, this excess material being cut off after the candle has hardened. The candles are then forced out of the molds by the plungers. Any sticking of the candles to the molds or plungers as they are being removed from the machine will shut down the process while the candles are removed manually, resulting in a significant loss in efficiency. The spiral taper candle is perhaps the most difficult of the molded candles to remove from the mold. The removal action requires enough pressure on the plunger at the bottom of the mold to effect release and to also virtually unscrew the candle from the mold. Sticking of the wax to the mold or plunger must be kept at a minimum.

Votive candles are molded similar to above. The wicks, however, are not cast in place. Rather, there is a metal pin in the center of the molded candle to accommodate the wick in a second operation. The molds are completely filled with melted wax with an excess in a reservoir chamber above each mold. This excess wax above each mold accommodates the shrinkage of the wax down into the molds as the candles are cooled. Upon complete solidification of the wax, the pins in the mold are removed and the excess wax is cut flush and level across the open surface of each mold. The molded candles are then simultaneously ejected from the mold by raising a plunger in each. In the molded candle operation it becomes critical that the candle wax not stick to the die, plunger or pin.

SUMMARY OF THE INVENTION

The present invention provides for a candle wax composition having improved mold release characteristics. The composition comprises candle wax and from about 0.01 to about 10 percent by weight of a mold release additive selected from the group consisting of dimethyl, diethyl and methyl-ethyl esters of aliphatic dicarboxylic acids having two to four carbon atoms and of phthalic acid and mixtures thereof. The candle wax composition possesses improved mold release properties over traditional candle wax composition.

DESCRIPTION OF THE PREFERRED EMBODIMENTS

The candle waxes used in the composition of this invention are those typically used commercially. The primary waxes currently used in candles are paraffin and stearin, but other waxes still find use. Various typical formulas for candle waxes are given in Table I (taken from KirkOthmer Encyclopedia of Chemical Technology, 2 ed., vol. 4, p. 58)

Table I:

| Component | Candle Wax Composition Typical Formulations, % weight | | | | | | | |
|---|---|---|---|---|---|---|---|---|
| | 1 | 2 | 3 | 4 | 5 | 6 | 7 | 8 |
| Paraffin | 60 | 70 | 60 | 75 | 67 | 48 | 60 | 85 |
| Stearic Acid | 35 | 20 | 30 | 25 | 33 | | | 15 |
| Beeswax | 5 | 10 | 10 | | | 52 | | |
| Japan Wax | | | | | | | 35 | |
| Synthetic Wax | | | | | | | 5 | |

The paraffin waxes used in the compositions of this invention are refined petroleum waxes obtained from the dewaxing of hydrocarbon oils and may be obtained by methods well known in the art, i.e., chilling the oil with the addition of a solvent and separating the precipitated wax by mechanical means such as filters, centrifuges and the like. Synthetic waxes, such as those made by the Fisher-Tropsche process are also useful. The paraffin waxes must be rather highly refined, i.e., they should contain no more than about 2.0% by weight oil and preferably 1.0% by weight or less. The paraffin waxes will be primarily mixtures of normal and isoparaffins.

A preferred paraffin wax is a paraffin wax having a melting point, as measured by ASTM Test Method D-87, of from about 47° to about 57° C., preferably from about 47° to about 55° C. and more preferably from about 50 to about 54° C. It will have average carbon numbers ranging from about 20 to about 30, preferably from about 23 to about 27 and will contain from about 85 to about 97 preferably from about 87 to about 95 percent by weight of normal-paraffins. A particularly desired wax is sold commercially (Shell Oil Company) as SHELLWAX ®100 Product and has a normality of about 92%, an average carbon number of about 25 and a melting point of about 52° C. To the above-described paraffinic wax is frequently added a hardening agent such as stearic acid (up to about 20%) or a higher melting point paraffin wax. A preferred higher melting point wax is a paraffinic wax having a melting point, as measured by ASTM Test Method D-87, of from about 78° to about 90° C., preferably from about 80 to about 88° C. and more preferably from about 82° to about 86° C. It will have average carbon numbers ranging from about 45 to about 55, preferably from about 47 to about 53 and will contain from about 10 to about 20 and preferably from about 12 to about 15 percent by weight of normal-paraffins. A particularly desired higher melting point wax is sold commercially (Shell Oil Company) as SHELLWAX 700 Product and has a normality of from about 12–15% by weight an average carbon number of about 50 and a melting point of about 84° C.

The waxes used in the composition can be drawn from the major classes of waxes as plant, such as Japan and bayberry waxes, animal (including insect) such as beeswax, mineral (including petroleum) such as paraffin and synthetics. The waxes or mixture of waxes utilized will have a melting point ranging from about 35° to about 85° C., and preferably from about 50° to about 70° C.

The mold release additive will comprise from about 0.01 to about 10, preferably from about 0.05 to about 5 and more preferably from about 0.1 to about 2 percent by weight of the total composition, and will comprise lower alkyl esters of aliphatic dicarboxylic acids and phthalic acids. The lower alkyl groups are selected from the group consisting of methyl, ethyl and mixtures thereof. The aliphatic dicaboxylic acids are saturated or unsaturated. Saturated and olefin-unsaturated aliphatic compounds are preferred, and have carbon numbers ranging from 2 to 4. Examples of the aliphatic dicarboxylic acids used to prepare the ester and oxalic acid, malonic acid, succinic acid, maleic acid, fumaric acid, acetylene dicarboxylic acid. The phthalic acids are the ortho, meta, or para isomers or mixtures thereof of the benzenedicarboxylic acids. The mold release additive comprise diesters of the dicarboxylic acids, diesters of the phthalic acids of mixtures thereof. The esters may be dimethyl, diethyl or mixed, i.e., methyl-ethyl, esters. The esters are formed by well known procedures, as for example, by the direct esterification of the dicarboxylic acids with ethanol, methanol or mixtures thereof in the presence of an acid catalyst.

The wax composition of this invention may contain minor amounts (less than 20% and preferably less than 10%) of other materials such as coloring agents, scenting agents and hardening agents or mixtures thereof.

The process employed to prepare the wax compositions of the invention is simple to perform and requires no particular equipment or precaution. The wax component is heated to its melting point and the mold release additive and any optional additives are combined with the molten wax. No particular order of addition is needed and standard laboratory or plant mixing or blending equipment will suffice. The combined components and optional additives are stirred or agitated while heating until a homogeneous mixture is produced. Ordinarily this requires only a matter of minutes with 5 to 15 minutes being typical. Longer stirring and heating times are not detrimental. After a homogeneous mixture is obtained, the mixture may be used directly to mold candles or it may be poured into storage containers to be used at a later time to produce candles.

The wax compositions of this invention may be used to produce candles or any other wax novelty items that are formed in metal molds.

The compositions of this invention and the properties will be further described by the following illustrative embodiments which are provided for illustration and are not to be construed as limiting the invention.

ILLUSTRATIVE EMBODIMENT I

Properties of paraffinic waxes used to prepare typical wax compositions of this invention are given in Table II.

Table II:

| Property | ASTM Test Method | Paraffinic Waxes Type A | Paraffinic Waxes Type B |
| --- | --- | --- | --- |
| Melt Point ° F | D-87 | 125 | 183 |
| Color, Saybolt | D-156 | +30 | +17 |
| Flash Point, C.O.C.,° F | D-92 | 405 | 585 |
| Penetration, Needle | D-1321 | | |
| at 77° F | | 13 | 6 |

Table II:-continued

| Property | ASTM Test Method | Paraffinic Waxes Type A | Paraffinic Waxes Type B |
| --- | --- | --- | --- |
| at 100° F | | 70 | 13 |
| at 110° F | | 90 | 17 |
| Oil Content, % Wt. | D-721 | 0.1 | 0.1 |
| Tensile Strength, p.s.i. at 73° F | D-1320 | 275 | 185 |
| Gradient Block Pt., (Pick/Block)° F | D-1465 | 93/94 | 135/139 |
| Refractive Index at 100° C | D-1747 | 1.4180 | 1.4370 |
| Lbs./Gal. at 60° F | | 7.59 | 7.84 |
| at 210° F | | 6.29 | 6.56 |

Types A and B are known as SHELLWAX 100 and SHELLWAX 700 Products and are available commercially from Shell Oil Company.

A wax component comprising 96%w of paraffinic was A and 4%w of paraffinic wax B was melted at a temperature of about 200° F. and various percentages of phthalates were mixed into the molten wax and the resultant individual composition were poured into a votive candle mold made of lead-tin alloy having dimensions of about 2 inches in height by about 1⅜ inches in diameter. The mold temperature at pour was about 60° F. After a dwell time of about 35 minutes in the mold, the candle was ejected from the mold and the force in pounds required to remove the candle from the mold was recorded. These compositions and their mold release properties are given in Table III.

Table III:

| Additive | Effect of Dimethyl and Diethyl Phthalate on Mold Release Properties on 96% w Wax A + 4% w Wax B Composition Concentration, % w | | | |
| --- | --- | --- | --- | --- |
| | 0.0 | 0.2 | 0.5 | 1.0 |
| Dimethyl Phthalate | M* | E | E | E |
| Diethyl Phthalate | | E | E | E |

*Letters denote the force in pounds required to remove the candle from the mold/-plunger; E=0-10, M=50-75

ILLUSTRATIVE EMBODIMENT II

A composition comprising 90%w Wax A and 10% Wax B was melted at about 200° F. To this melted composition was added 0.2%w diethyl phthalate. This resultant composition was poured into a commercial spiral taper mold 8 inches long made of lead-tin alloy cooled to about 50° F. The pour was repeated for cooling bath temperatures of 60°, 70°, and 80° F. After a cooling time of about 35 the candle was ejected and excellent mold release was achieved at all cooling temperatures.

ILLUSTRATIVE EMBODIMENT III

Compositions comprising 98%w Wax A and 2%w Wax B were melted at about 200° F. To the melted compositions were added various concentrations of various additives (listed in Table III). The resultant individual compositions were poured into a votive candle mold made of lead-tin alloy and having dimensions of about 2 inches in height by about 1⅜ inches in diameter. The mold temperature at pour was about 70° F. After a dwell time of about 35 minutes in the mold, the pin was withdrawn and the candle was ejected from the mold. The force in pounds required to remove the pin or the candle from the mold is given in Table IV.

Tasble IV:

Effect of Additives on Mold Release Properties of 98% w Wax A + 2% w Wax B Composition

| Additives | % w | Pin Release In Pounds | Mold Release In Pounds |
|---|---|---|---|
| None |  | 90 | 120 |
| Stearic Acid | 2.0 | 60 | 105 |
| Diethyl Succinate | 0.5 | 18 | 0 |
|  | 1.0 | 16 | 0 |
|  | 1.5 | 16 | 0 |
|  | 2.0 | 14 | 0 |
| Diethyl Phthalate | 0.5 | 18 | 0 |
|  | 1.0 | 18 | 0 |
|  | 1.5 | 10 | 0 |
|  | 2.0 | 5 | 0 |

What is claimed is:

1. A wax composition having improved mold release properties comprising candle wax and from about 0.01 to about 10 percent by weight of mold release additive selected from the group consisting of dimethyl, diethyl and methyl-ethyl esters of aliphatic dicarboxylic acids having two to four carbon atoms and mixtures thereof.

2. The composition of claim 1 wherein the mold release additive ranges from about 0.05 to about 5 percent by weight.

3. The composition of claim 2 wherein the mold release additive ranges from about 0.1 to about 2 percent by weight.

4. The composition of claim 1 wherein the candle wax is selected from the group consisting of paraffin, stearic acid and beeswax and mixtures thereof and has a melting point ranging from about 35° C. to about 85° C.

5. The composition of claim 4 wherein the wax is paraffin.

6. The composition of claim 5 wherein the paraffin has a melting point of from about 50° to about 70° C.

7. A candle wax composition having improved mold release properties comprising
   (a) a lower melting point paraffin wax characterized by a melting point of from about 47° to about 57° C., an average carbon number of from about 20 to about 30, and a normality of from about 85 to about 97 percent by weight,
   (b) a hardening agent selected from the class consisting of stearic acid and a higher melting point paraffin wax, said higher melting point paraffin wax being characterized by a melting point of from about 78° to about 90° C., an average carbon number of from about 45 to about 55, and a normality of from about 10 to about 20 percent by weight, and
   (c) from about 0.01 to about 10 percent by weight of a mold release additive, selected from the class consisting of dimethyl, diethyl and methyl-ethyl esters of aliphatic dicarboxylic acids having two to four carbon atoms and of phthalic acids and mixtures thereof.

8. The composition of claim 7, wherein the hardening agent is stearic acid.

9. The composition of claim 7, wherein the hardening agent is the higher melting point paraffin wax.

10. The composition of claim 9, wherein the candle wax composition comprises from about 0.05 to about 5 percent by weight of the mold release additive.

11. The composition of claim 10, wherein the candle wax composition comprises from about 0.1 to about 2 percent by weight of the mold release additive.

12. The composition of claim 9, wherein the lower melting point paraffin wax is characterized by a melting point of from about 47° to about 55° C., an average carbon number of from about 23 to about 27 and a normality of from about 87 to about 95 percent by weight, and the higher melting point paraffin wax is characterized by a melting point of from about 80° to about 88° C., an average carbon number of from about 47 to about 53, and a normality of from about 12 to about 15 percent by weight.

13. The composition of claim 12 wherein the candle wax composition comprises from about 0.05 to about 5 percent by weight of the mold release additive.

14. The composition of claim 13 wherein the candle wax composition comprises from about 0.01 to about 2 percent by weight of the mold release additive.

15. The composition of claim 9 wherein the lower melting point paraffin wax is characterized by a melting point of about 52° C., an average carbon number of about 25, and a normality of about 92 percent by weight, and the higher melting point paraffin wax is characterized by a melting point of about 84° C., an average carbon number of about 50, and a normality of from about 12 to about 15 percent by weight.

16. The composition of claim 15, wherein the candle wax composition comprises from about 0.05 to about 5 percent by weight of the mold release additive.

17. The composition of claim 16, wherein the candle wax composition comprises from about 0.1 to about 2 percent by weight of the mold release additive.

18. The composition of claim 17, wherein the candle wax composition comprises between about 88 and about 98 percent by weight of the lower melting point paraffin wax and between about 2 and about 10 percent by weight of the higher melting point paraffin wax.

19. In the process for the manufacturing of candles by preparing a molten candle wax composition, pouring or injecting the molten candle wax into a candle mold, cooling the mold to harden the wax, and forcing the candle out of the mold by means of a plunger, the improvement which comprises adding to the molten candle wax composition before it is poured or injected into the mold a mold release agent, selected from the group consisting of dimethyl, diethyl, and methylethyl esters of aliphatic dicarboxylic acids having two to four carbon atoms and of phthalic acids and mixtures thereof, thereby producing an improved candle wax composition of superior mold release properties containing from about 0.01 to about 10 percent by weight of the mold release agent.

* * * * *